United States Patent
Grant et al.

(10) Patent No.: US 6,710,864 B1
(45) Date of Patent: Mar. 23, 2004

(54) CONCENTRICITY MEASURING INSTRUMENT FOR A FIBEROPTIC CABLE END

(76) Inventors: David L. Grant, 1270 Calle El Cameron, Thousand Oaks, CA (US) 91360; David S. Marx, 856 Karen Way, Long Beach, CA (US) 90815

(*) Notice: Subject to any disclaimer, the term of this patent is extended or adjusted under 35 U.S.C. 154(b) by 0 days.

(21) Appl. No.: 10/382,669

(22) Filed: Mar. 5, 2003

(51) Int. Cl.⁷ .............................................. G01N 21/00
(52) U.S. Cl. ...................................................... 356/73.1
(58) Field of Search ........................ 356/73.1; 382/141, 382/151, 152, 288; 385/59–76, 89

(56) References Cited

U.S. PATENT DOCUMENTS

| | | | |
|---|---|---|---|
| 4,215,937 A | * | 8/1980 | Borsuk ...................... 356/73.1 |
| 4,468,118 A | | 8/1984 | Bice |
| 4,572,665 A | | 2/1986 | Benoit |
| 4,779,978 A | | 10/1988 | Hatton et al. |
| 5,657,131 A | | 8/1997 | Csipkes et al. |
| 6,011,616 A | * | 1/2000 | Volcy et al. ................ 356/73.1 |
| 6,421,118 B1 | * | 7/2002 | Shaar ......................... 356/73.1 |
| 6,456,369 B1 | * | 9/2002 | Ohki et al. ................. 356/73.1 |

* cited by examiner

*Primary Examiner*—Tu T. Nguyen
(74) *Attorney, Agent, or Firm*—Jack C. Munro

(57) ABSTRACT

An apparatus and method of ascertaining the position of a core within a fiberoptic cable and calculating the position of the core relative to the cladding and jacket of the fiberoptic cable. The apparatus provides for observing of the end of the fiberoptic cable by using grazing incident illumination which causes the diameter of the core, the diameter of the cladding and the diameter of the jacket of the fiberoptic cable to be readily observed and then utilizing of a microscope and associated software to read the average diameter of the core and its position relative to the average diameter of the cladding and the average diameter of the jacket which will then make a determination as to how far off center the core is relative to the cladding and the jacket.

14 Claims, 3 Drawing Sheets

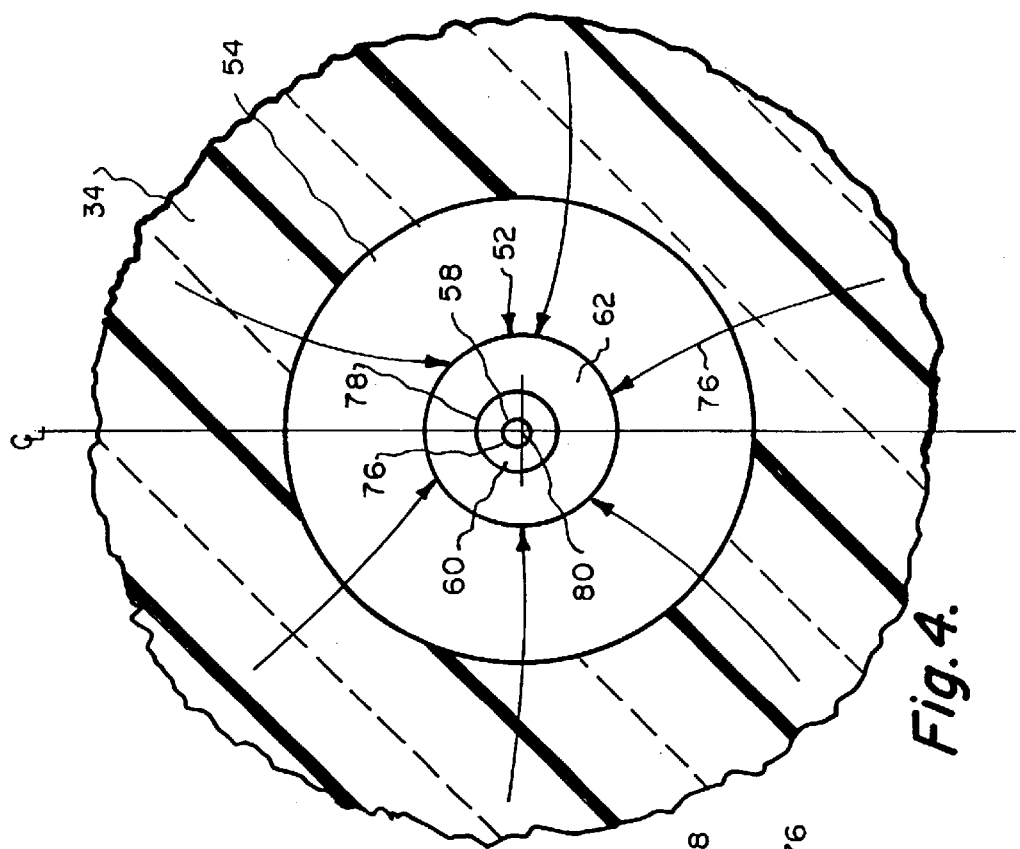
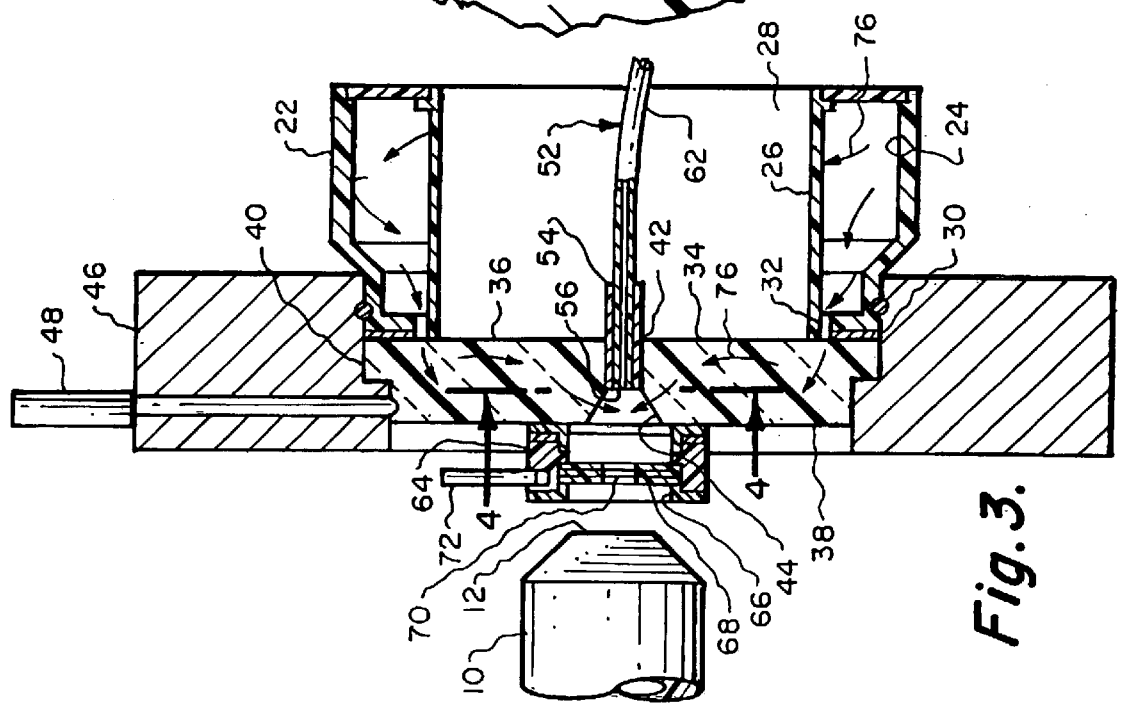

CONCENTRICITY MEASURING INSTRUMENT FOR A FIBEROPTIC CABLE END

BACKGROUND OF THE INVENTION

1. Field of the Invention

The field of this invention relates to a concentricity measuring instrument for a fiberoptic cable end.

2. Description of the Related Art

Fiberoptic cables are flexible, elongated essentially transparent devices that are used for either image or data transmission with the light being propagated through the cable. The fiberoptic cable has a core with a refractive index higher than that of the surrounding cladding. Surrounding the cladding is what is called a jacket. The light is to be transmitted through the core with the cladding and jacket functioning to contain the light and not permit the light to be transmitted through the side of the cable.

Fiberoptic cables can be constructed of any desired length. Typically, these cables may be anywhere from a few inches in length to hundreds of feet in length. Quite often, it is required that a fiberoptic cable be connected to another fiberoptic cable with the light from the one fiberoptic cable to be transmitted through the other fiberoptic cable. Each fiberoptic cable has a core and this is where the light is being transmitted. The core of one fiberoptic cable must precisely align with the core of the other fiberoptic cable in order to obtain maximum efficiency of transmission of the light. Any misalignment, even as small as less than one micron, can cause a substantial reduction in the efficiency of the transmission of light and possibly even no transmission of light at all.

If a cut is transversely made through a fiberoptic cable and one was able to observe that cut surface, the core will be represented as a small centrally located circle generally only a few microns in diameter. Surrounding that core and integrally connected therewith is a cladding which is substantially greater in diameter than the core. Still further surrounding the cladding in most fibers in a concentric relationship is a jacket. The diameter of the jacket is frequently not greater than one-sixteenth or one-eighth of an inch. It is desirable to ascertain the concentricity of the core relative to the cladding and the jacket which will inform the technician the exact position of the core. This determining of the positioning of the core is at the time of manufacture of the cable. If it is determined that the core is off center beyond a certain tolerance, then that particular manufactured cable is rejected. When one cable end abuts against another cable end, the cores between the respective cable ends must be in precise alignment. At the present time, there is no known structure to clearly and easily observe the core relative to the cladding.

SUMMARY OF THE INVENTION

A concentricity measuring instrument for a fiberoptic cable end which utilizes a mounting block that is constructed of a plastic material that randomly disperses light. Formed within the mounting block is a through opening with this through opening being adapted to receive a fiberoptic cable end. The mounting block is attached to a ring with the ring having a light outlet window formed therein. Light is to be transmitted to the ring and emitted through the window into the block. The light within the block illuminates the cable end from the side. A microscope is then used to observe the cable end with the microscope being connected to software which then can calculate the position of the core relative to the cladding and the jacket of the fiberoptic cable and make a determination how far off precise center the core is relative to the cladding and the jacket.

A further embodiment of the present invention is where the previous apparatus utilizes a block constructed of epoxy resin and titanium dioxide particles A further embodiment of the present invention is where the apparatus is constructed so that the through opening formed within the block is centrally mounted within the block.

A further embodiment of the present invention is where the previous apparatus is modified by the through opening including a cone-shaped enlargement within the through opening through which the observation by the microscope is to occur.

A further embodiment of the present invention is where the apparatus is defined to include a ring on which the block is mounted with this ring including an annular light outlet window through which the light is to be transmitted within the block.

A further embodiment of the present invention is where the apparatus is modified by the ring on which the block is mounted includes an annular light receiving chamber.

A further embodiment of the present invention is where the apparatus is modified by there being mounted on the block an iris which improves the contrast of the observation by the microscope.

A further embodiment of the present invention is where the just previous embodiment is modified by the iris being adjustable so as to vary the size of the aperture through the iris in order to maximize the observation by the microscope.

A further embodiment of the present invention relates to the method of ascertaining the concentricity of a core of a fiberoptic cable end which comprises the steps of placing the fiberoptic cable end within a block which is constructed to randomly disperse light, projecting of the light directly into the block with the light illuminating the cable end from the side of the cable end, observing of the cable end with the observation being able to detect the position of the core relative to the surrounding cladding and jacket and calculating the position of the core relative to the precise center of the cable.

A further embodiment of the present invention is where the method just described utilizes unfocused light from a non-coherent source.

A further embodiment of the present invention is where the basic method of the present invention utilizes a microscope in conjunction with an iris in making of the observation of the cable end.

A further embodiment of the present invention is where the method of the present invention requires placing of the cable end in a through hole formed within the block.

A further embodiment of the present invention is where the just previous embodiment is modified by centrally locating of the through hole within the block.

A further embodiment of the present invention is where the basic method of the present invention is modified by utilizing of a block that is constructed of an epoxy resin plus titanium dioxide particles.

BRIEF DESCRIPTION OF THE DRAWINGS

For a better understanding of the present invention, reference is to be made to the accompanying drawings. It is to be understood that the present invention is not limited to the precise arrangement shown in the drawings.

FIG. 3 is a longitudinal cross-sectional view through the apparatus of the present invention taken along line 3—3 of FIG. 2;

FIG. 4 is an enlarged view of a fiberoptic cable end that is being observed by using of the apparatus of the present invention taken along line 4—4 of FIG. 3.

DETAILED DESCRIPTION OF THE INVENTION

Figure 1:
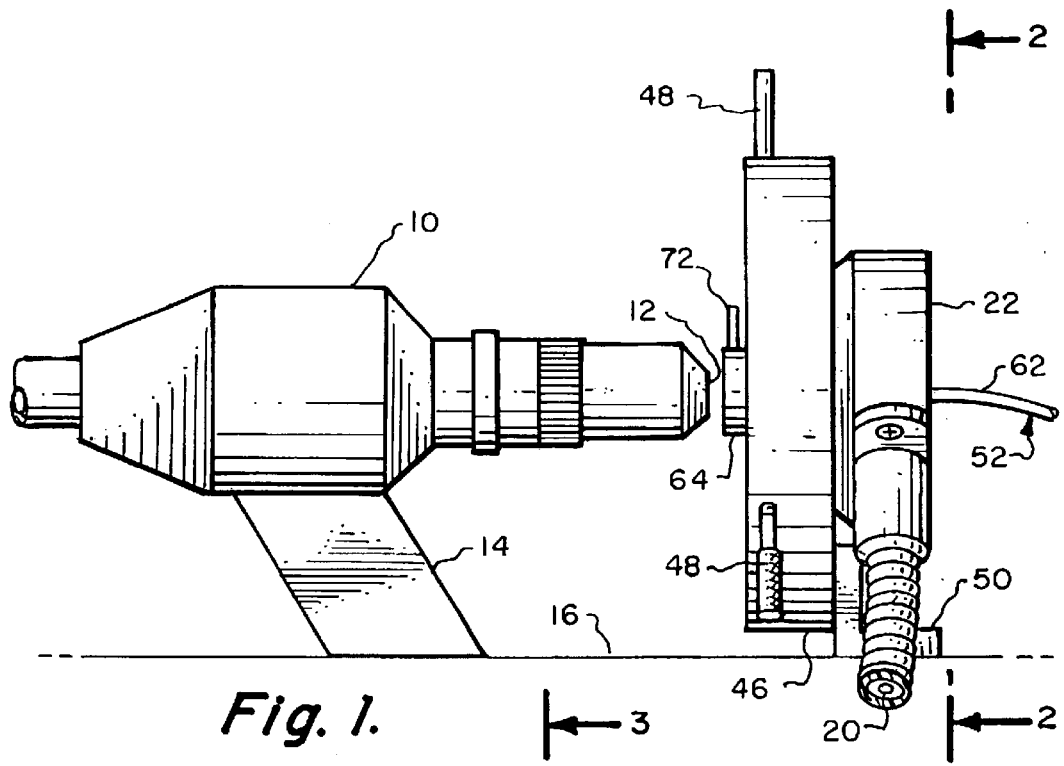
FIG. 1 is a side elevational view of the apparatus that is used to ascertain the concentricity of a core of a fiberoptic cable end of this invention.

Referring particularly to the drawings, there is shown in FIG. 1 a microscope 10 or other imaging device which is deemed to be of conventional microscope construction. An observation is capable of being made by the microscope 10 through a lens assembly, which is not shown, with the observation occurring through a lens aperture 12. Normally the microscope 10 will be mounted by a stand 14 on a supporting surface 16. A typical supporting surface 16 would be a table or bench.

Light from a source 18 is supplied within a cable 20. The cable 20 is mounted to a ring 22. Ring 22 has an internal annular chamber 24. The inner surface of the annular chamber 24 is closed by means of a sleeve 26. Internally of the sleeve 26 is a through passage 28. The light from the cable 20 is supplied within the annular chamber 24 and illuminates such. The ring 22 has a mounting surface 30. Within the mounting surface 30 there is formed an annular window 32. The light from the annular chamber 24 is capable of being emitted from the window 32.

A block 34 is to be mounted directly against the mounting surface 30 covering the window 32. A block 34 constitutes a light randoming disk generally no more than a couple of inches in diameter. The disk is constructed of liquid epoxy resin which is combined with a quantity of a liquid hardener to which has been added 0.6 grams of 0.2 to 0.3 micron titanium dioxide particles which are evenly dispersed in the resin. Other light scattering particles could be used. Also, the block could be made of other plastic or even glass as long as it is optically clear. This composition is placed within a mold and cured at one-hundred fifty degrees Fahrenheit for about three to four hours. The resulting block 34 is then removed from the mold and then machined so that the inner side 36 and the outer side 38 are made smooth as well as the external peripheral surface 40 of the block 34. The function of the block 34 is to produce a random, unfocused non-coherent light source. The block 34 produces even illumination of the fiberoptic cable end 56 which is important for achieving accurate determining of the core 58 of the cable. If light was transmitted from only one direction, the light rays would reflect off the cable end 56 producing a "shifted" appearance. This "shifting" of the appearance is an effect that is canceled by the even illumination from, in affect, an infinite number of light sources by using the block 34. The block 34 causes light to be emitted from a discrete location (s).

Figure 2:
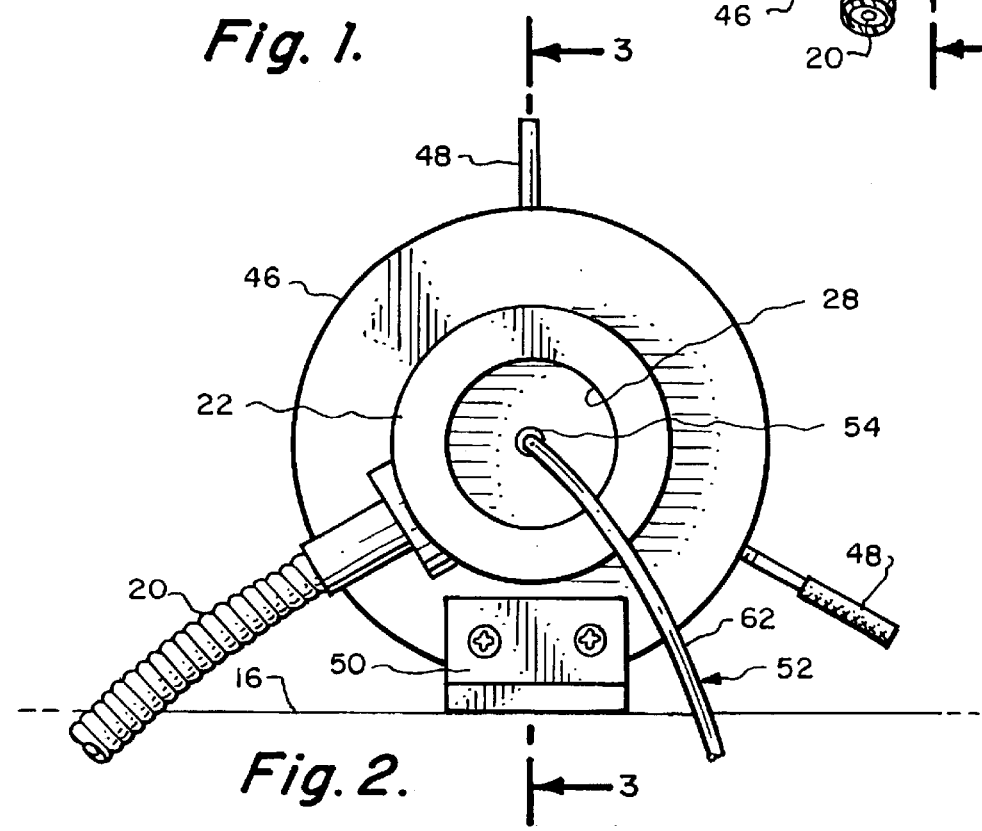
FIG. 2 is an end view of the apparatus of the present invention taken along line 2—2 of FIG. 1.
Figure 5:
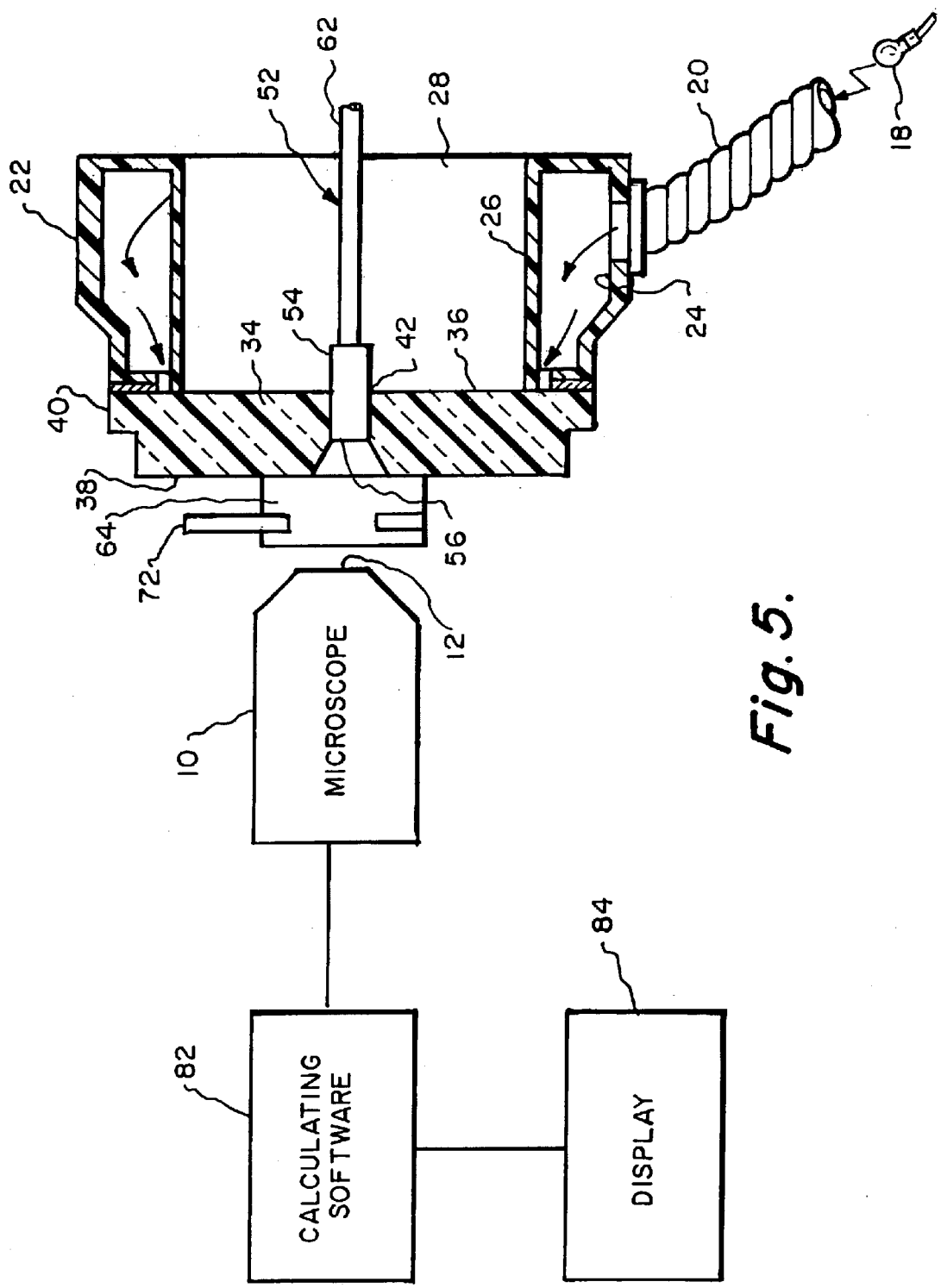
FIG. 5 is a block diagram representation showing how the observed view by the microscope is utilized to ascertain the concentricity of the core of the fiberoptic cable end.

Formed centrally within the block 34 and connecting between the outer side 38 and the inner side 36 is a through opening 42. The through opening 42 is mainly cylindrical but directly adjacent the outer side 38 the through opening 42 expands to a cone-shaped enlarged opening 44. The block 34 is then fixedly mounted within a mounting ring 46. The mounting ring 46 has mounted therein a plurality of threaded rods 48. Generally, there will be at least two in number of the threaded rods, which is clearly shown in FIG. 2. These threaded rods 48 are to be screwed tightly down against the peripheral surface 40 fixedly mounting of the block 34 in position within the mounting ring 46. The mounting ring 46 is fixedly secured to a base plate 50. The base plate 50 is then mounted on the supporting surface 16.

A fiberoptic cable 52 is mounted within a ferrule 54. The fiberoptic cable 52 is readily bendable and generally comprises a glass material. The fiberoptic cable 52 is fixedly mounted within the ferrule 54 which is usually constructed of a ceramic material. The ferrule 54 is then fixed within the through opening 42. The fact that the ferrule 54 is mounted in the through opening does not insure that the core of the cable is precisely centered in the through opening. The ferrule 54 and the cable end 56 that is mounted within the ferrule 54 can be readily removed from the through opening 42. It is important that the cable end 56, which is generally spherical, be as clean as possible and does not protrude exteriorly of the block 34. The best position for the cable end 56 is to be in alignment with the surface that junctions between the enlarged cone-shaped opening 44 and the cylindrical portion of the through opening 42.

Typical construction of the diameter of the cable 52 will generally be no more than one-eighth or one-sixteenth of an inch in diameter. The fiberoptic cable 52 is constructed to have a centrally located core 58. The core 58 is constructed to have a high degree of transparency so as to readily transmit light. Surrounding the core 58 is a cladding 60 with the cladding 60 having a high degree of reflectivity. It is the function of the cladding 60 to keep the light channeled within the core 58 and not permit the light to be conducted laterally exteriorly of the fiberoptic cable 52. Protecting and mounted exteriorly around the cladding 60 is a jacket 62. The ferrule 54 is mounted directly onto the jacket 62. The diameter of the core 58 is generally no more than a few microns in diameter. The diameter of the cladding 60 is generally about ten times the diameter of the core 58 with the diameter of the jacket 62 being two to three times as great as the diameter of the cladding 60. It is to be understood that the core 58, cladding 60 and jacket 62 are all constructed of a glass material.

Fixedly mounted onto the outer surface 38 of the block 34 is an iris diaphragm 64. The iris diaphragm 64 includes a through passage 66 which is to be aligned with the conical shaped enlarged opening 44. Mounted within the through passage 66 is a shutter 68. The shutter 68 has a center hole 70. Connected with the shutter 68 and extending exteriorly of the iris diaphragm 64 is a lever 72. Manual movement of the lever 72 will cause the center hole 60 to be made smaller or to be enlarged. The lens aperture 12 of the microscope 10 is to be located directly adjacent the through passage 66 and in alignment with such. One reason for the iris diaphragm 64 is so that the contrast can be improved by narrowing or enlarging of the opening 70 when using of the microscope 10 to observe the cable end 56. Another reason for the iris diaphragm is that light is received only directly in axial alignment with the cable end 56 with the structure surrounding the opening 70 functioning to block all light that is not axially reflected. This is desirable to produce the optimal image of the cable end 56.

The light, represented by arrows 76 in FIG. 3 and FIG. 4, is being transmitted through the sidewall of the through opening 42 to illuminate the cable end 56. The light is random, unfocused, non-coherent light. The illumination occurs at what is termed a grazing incident, that is from the side. The light being emitted from the block 34 is directed to the cable end 56 anywhere from zero degrees to about forty-five degrees. This angular direction of light is what is deemed as a grazing incident. The reflection of this grazing incident is what is observed by the microscope 10. This side illumination is what results in the microscope 10 being able to accurately differentiate surfaces with varying indices of refraction which results in observing the barrier circle 76 located between the core 58 and the cladding 60 and also barrier circle 78 located between the cladding 60 and the jacket 62. The most desirable position for the center of the core 58 is to coincide with center point 80 of the fiberoptic cable 52. However, in the manufacture of the fiberoptic cable 52, it is almost impossible to get the center point of the core 58 precisely in alignment with the center point 80. However, it is possible to get the center point 80 of the core 58 exceedingly close (within one micron or possibly even less than one micron) in alignment with the center point 80. If, by the observation of the microscope 10 a determination is made that the center point of the core 58 is not in alignment (within the established tolerance) with the center point 80, which is shown in FIG. 4 of the drawings, then that particular fiberoptic cable 52 will be rejected by the manufacturer. If the core 58 is precisely centered within certain limits with the center point 80, then that particular fiberoptic cable 52 will constitute a saleable item. It is to be remembered that fiberoptic cables 52 are commonly joined together. In the joining process, it is necessary to achieve the maximum amount of transmission of the light from one fiberoptic cable to another by the cores 58 of the joined fiberoptic cables being in precise alignment. It doesn't take much of a misalignment to result in a substantial loss of light transmission and even possibly a complete loss of light transmission.

The microscope 10 is connected to some calculating software 82. The calculating software 82 is in turn connected to a display 84. The microscope 10 is designed to make a series of readings on the cable end 56 making measurements relative to the center point 80 arriving at an average diameter arrangement for the core 58, for the cladding 60 and for the jacket 62. The numerous readings that are made by the calculating software 82 is then averaged and this average number is then displayed by the display 84. If the display 84 shows that the diameter of the core 58 is within the established tolerance, then that particular fiberoptic cable 52 is deemed to be constructed satisfactorily and is then available to be used.

What is claimed is:

1. A concentricity measuring instrument for a fiberoptic cable end comprising:

a mounting block having an inner side and an outer side, said mounting block being constructed of a plastic material that randomly disperses light, said mounting block having a through opening that extends between said inner side and said outer side, said through opening having a sidewall, said through opening adapted to removably mount therewithin a fiberoptic end of a fiberoptic cable;

a ring having a mounting surface, a light outlet window formed within said mounting surface, said inner side of said mounting block being mounted against said light outlet window, a light transmitting cable mounted to said ring, said light transmitting cable adapted to receive light and transmit such to within said ring; and whereby light within said block is emitted into said through opening through said sidewall to supply grazing incident light to the fiberoptic cable end, whereby an imaging device is to be located directly adjacent said outer side of said mounting block and in alignment with said through opening with the imaging device to be used to observe the fiberoptic cable end and ascertain the different layers of the fiberoptic cable end which are the core, the cladding and the jacket and determine whether the core is precisely centered relative to the cladding and the jacket or is off center and by what amount.

2. The concentricity measuring instrument for a fiberoptic cable end as defined in claim 1 wherein:

said mounting block being constructed of epoxy resin and a hardener plus a quantity of titanium dioxide particles that are evenly dispersed throughout said mounting block.

3. The concentricity measuring instrument for a fiberoptic cable end as defined in claim 1 wherein:

said through opening being centrally formed within said mounting block.

4. The concentricity measuring instrument for a fiberoptic cable end as defined in claim 1 wherein:

said through opening including a cone-shaped enlarged section which connects with said outer side, said cone-shaped enlarged section facilitating observing of the fiberoptic cable end.

5. The concentricity measuring instrument for a fiberoptic cable end as defined in claim 1 wherein:

said light outlet window being annular in configuration.

6. The concentricity measuring instrument for a fiberoptic cable end as defined in claim 1 wherein:

said ring including a light receiving chamber, said light outlet window connecting with said light receiving chamber, said light receiving chamber being annular in configuration.

7. The concentricity measuring instrument for a fiberoptic cable end as defined in claim 1 wherein:

an iris mounted on said outer side of said mounting block, said iris having a light observing aperture, said light observing aperture being in alignment with said through opening, said iris being for the purpose of improving the contrast when observing of the fiberoptic cable end.

8. The concentricity measuring instrument for a fiberoptic cable end as defined in claim 7 wherein:

said light observing aperture being adjustable in size.

9. The method of ascertaining the concentricity of a core of a fiberoptic cable end relative to a precise center of a fiberoptic cable comprising the steps of:

placing said end in a block that is constructed to randomly disperse light;

projecting light directly into said block with the light illuminating said cable end from the side of said cable end;

observing of said cable end with the observation being able to detect the position of said core relative to the surrounding cladding and jacket that make up said fiberoptic cable; and calculating the position of said core relative to said center of said fiberoptic cable.

10. The method as defined in claim 9 where the light that is used to illuminate said cable end comprises random, unfocused, non-coherent light.

11. The method as defined in claim 9 where the observing step is accomplished by a microscope with the image of said cable end being projected through an iris with an adjustable aperture.

12. The method as defined in claim 9 wherein the step of placing comprises inserting of said fiberoptic cable end within a through hole formed within said block.

13. The method as defined in claim 12 which provides for centrally locating said through hole within said block.

14. The method as defined in claim 9 wherein the placing step includes constructing of said block of epoxy resin that has evenly dispersed therein a quantity of light scattering particles.

* * * * *